July 18, 1961
H. A. BROCK
2,992,750
AUTOMATIC UNLOADING TRAILER
Filed Jan. 2, 1958
3 Sheets-Sheet 1
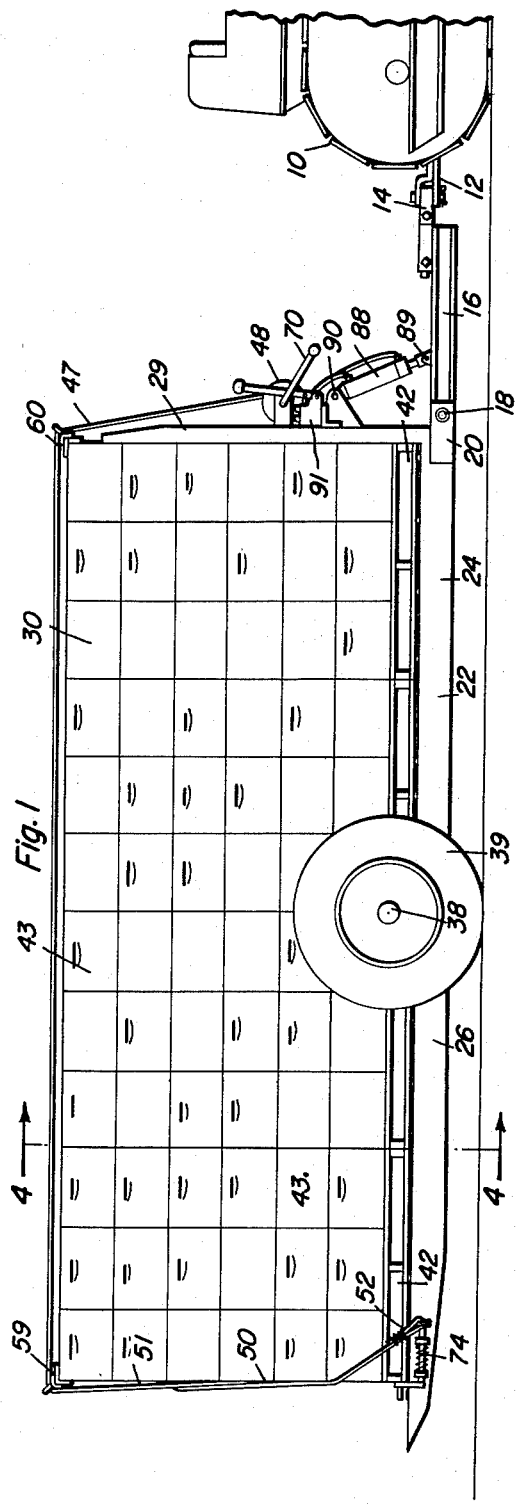
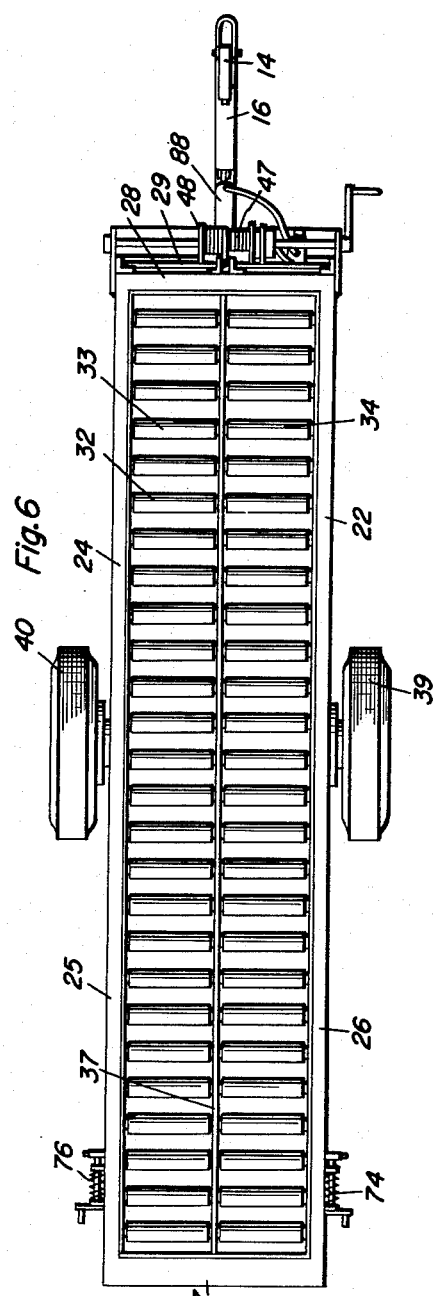
Harold A. Brock
INVENTOR.
BY *Clarence A. O'Brien*
*and Harvey B. Jacobson*
Attorneys

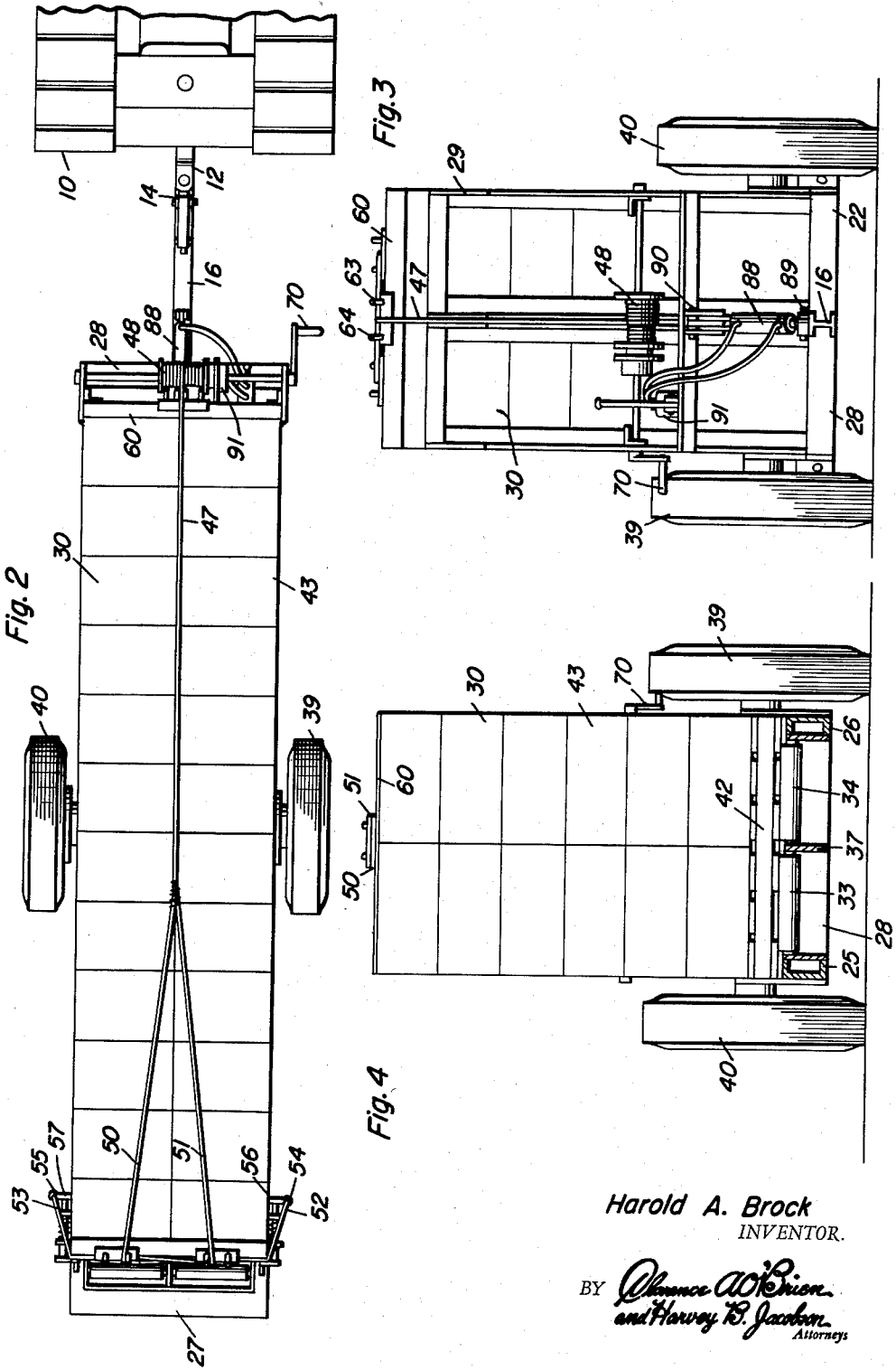

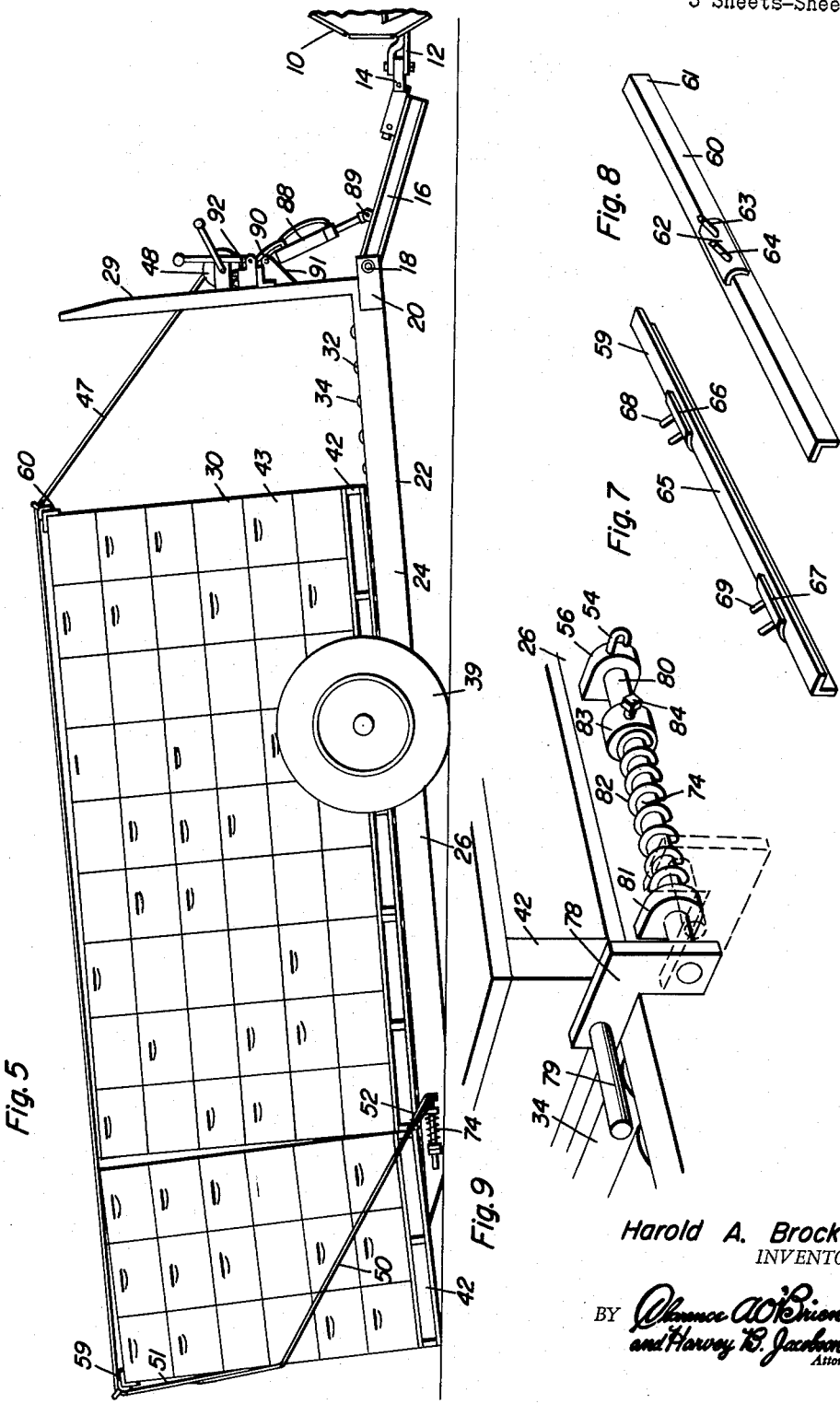

United States Patent Office 2,992,750
Patented July 18, 1961

2,992,750
AUTOMATIC UNLOADING TRAILER
Harold A. Brock, Rte. 1, Box 480, Placerville, Calif.
Filed Jan. 2, 1958, Ser. No. 706,720
5 Claims. (Cl. 214—506)

This invention relates to a trailer and more particularly to a trailer in which the unloading thereof is facilitated.

Considerable time and effort is involved in unloading trucks and trailers, particularly the latter. In fruit picking, the fruit is generally placed in boxes and moved from the orchard on trailers. Thereafter the boxes are hand stacked on the ground after they have been brought out of the orchard. My invention eliminates the hand stacking of the boxes after they have been brought out of the orchard. This is achieved by my unique trailer that has a pivoted tongue and means for tilting the trailer bed about that pivot and about the trailer axle in order to tilt the trailer bed at a slight incline to facilitate the movement of pallet supported boxes off the trailer. The unloading is accomplished by moving the trailer forward after it has been adjusted to the inclined position.

It is preferred that the trailer have a conveyor in or on its bed so that the pallet supported boxes are easily moved off the trailer. In order to prevent the pallets and/or boxes from being discharged from the trailer at too great a rate, there is installed a brake for the boxes and pallets. This brake has a harness, which can be a cable, extending over the top and rear of the load on the trailer and attached to the trailer bed at its end. By using a winch with the cable the cable can be payed out slowly as the trailer is pulled forward by a truck, tractor, etc. and thereby permit the load of pallets and boxes on the trailer to be gently discharged.

Thereafter the harness is lashed over the empty pallets on the trailer bed and the trailer moved to a new location for further work.

Other objects and features of importance will become apparent in following the description of the illustrated form of the invention.

FIGURE 1 is a side view of a loaded trailer constructed in accordance with the invention.

FIGURE 2 is a top view of the trailer in FIGURE 1.

FIGURE 3 is a front end view of the trailer in FIGURE 1.

FIGURE 4 is a transverse sectional view taken on the line 4—4 of FIGURE 1.

FIGURE 5 is a side view of the loaded trailer in tilted position and in the process of being unloaded.

FIGURE 6 is a top view of the trailer with the load removed.

FIGURE 7 is a perspective view of a part of the apparatus used in the harness for the load.

FIGURE 8 is a perspective view of another part of the same apparatus that is used at the front top corner of the load.

FIGURE 9 is a perspective view of a latch to hold the pallets on the trailer bed.

In the accompanying drawings there is a vehicle 10 representing any type of draft vehicle such as a tractor or truck. It has a drawbar 12 with a coupling 14 connecting tongue 16 to it. The coupling 14 has a horizontal pivot about which the tongue can oscillate. The inner end of the tongue is secured by a horizontal pivot 18 to the front end structure 20 of main frame 22 of the trailer 24. The trailer frame 22 is rectangular having sides 25 and 26 together with ends 27 and 28 connected to the sides. An upstanding front wall 29 rises from end 28 and constitutes an abutment against which the load 30 is brought when loading the trailer 24. Conveyor 32 is either in or on the frame 22 and may assume several configurations. One of these consists of two groups 33 and 34 of transverse rollers whose ends have their spindles mounted in bearings on sides 25 and 26 and an intermediate frame member 37 that is fixed to ends 27 and 28 of frame 22.

An axle 38 is secured to frame 22, either directly or through a spring suspension. Wheels 39 and 40 are carried by the axle ends and these form the sole ground support of the trailer so that it can pivot about the axis of axle 38 as shown in FIGURE 5.

Although the trailer can be loaded with sundry items, articles, equipment, etc., the trailer operates exceedingly well with a load that is on pallets such as pallets 42. These have fruit or vegetable boxes 43 thereon which comprise load 30. The pallets slide easily over the bed of the trailer because they are designed to operate well with roller conveyors. When the trailer is loaded it will support a number of pallets on which boxes 43 are disposed (FIGURE 1). To hold the load 30 in place a simple harness is used. The harness may assume several configurations, one being a cable 47 with the inner end on a winding drum 48 and the outer end terminating in cables 50 and 51. These are crossed behind the load 30 (FIGURE 2), and their extremities have loops 52 and 53 that are attached to hooks 54 and 55. The hooks are secured to brackets or bearings 56 and 57 and these are fixed to the sides of the frame 22. Guides 59 and 60 are mounted on the rear upper corner and the front upper corner of load 30 and have the harness cable engaged thereover. Guide 60, see FIGURE 8, is constructed of an angle member 61 with a mounting plate 62 fixed to it intermediate its ends. A pair of rods 63 and 64 are fixed to the plate 62 and spaced from each other to form a guideway through which cable 47 is passed. Guide 59, see FIGURE 7, is constructed of an angle member 65 that has two mounting plates 66 and 67 fixed to it and spaced from each other. Pairs 68 and 69 of rods extend from mounting plates 66 and 67 and have the cables 50 and 51 pass through the passages which are formed by these pairs of rods.

Winding drum 48 is a part of a winch that is mounted in brackets on wall 29 and that has a handle 70 at one side of the trailer. By winding the handle in one direction the harness is tightened on the load. By releasing the brake that constitutes part of the winch, the winding drum is capable of being operated in the opposite direction, that is a direction which pays out the cable 47.

Since the bed of the trailer has roller conveyor 32, it is desirable that the load 30 be lashed tightly down so that it does not shift. The harness will serve this purpose. In addition there are two latches 74 and 76 attached to sides 26 and 25 of the frame of the trailer. The purpose of each latch is to place a stop behind the rearmost pallet 42. The front pallet strikes the abutment formed by wall 29 while the rear pallet is held by the stops provided by the latches 74 and 76. Latch 74 is identically constructed to latch 76, and is shown in detail in FIGURE 9. It consists of a stop 78 formed by an angular plate that has a handle 79 fixed to it. The stop is secured to spindle 80 that is carried in bearings 56 and 81 that are both attached to side 26 of frame 22. Spindle 80 is capable of oscillating between the full and dotted line positions of FIGURE 9 and has a torsion spring 82 on it. One end of the torsion spring is anchored to the main frame 22 or to fixed bearing 81. The other end of the torsion spring is attached to collar 83 held in place on spindle 80 by setscrew 84 or some other fastener which corresponds to the setscrew in function. The bias of the torsion spring 82 is in a direction which projects the stop to the full line or pallet holding position, that is with a part of the stop plate resting on the upper edge of the side 26 of frame 22. When unloading the trailer the latches 74 and 76 are released by lifting the stops 78 by handles 79 and moving the stops to the dotted line position of FIGURE 9 and therein sliding the pallets 42 toward the rear or discharge end of the trailer. Once the pallets start to move past the released latches, the latches are prevented from returning to the pallet latching positions by the passage of the pallets.

A fluid motor, for example hydraulic cylinder 88, is pivoted between the horizontal pivot of coupling 14 and pivot 18 and to tongue by a horizontal pivot structure 89. The opposite end of the hydraulic cylinder is mounted by a horizontal pivot 90 on a mounting bracket 91. This is fixed to the wall 29. A source of hydraulic power on towing vehicle 10 or a separate source, is used and will include a standard control valve, not shown, which is preferably but not necessarily, mounted on the wall 29. The purpose of the hydraulic cylinder is to pivotally adjust the position of tongue 16 to obtain a horizontl disposition of the bed of the trailer when the trailer is being moved from one place to another. The principal purpose, though, is to tilt the front end of the trailer upward thereby correspondingly lowering the rear end of the trailer inasmuch as the trailer is supported wholly by the pair of wheels 39 and 40 making it quite easy to tilt the trailer about an approximately horizontal axis. After assuming a tilted position (FIGURE 5) the load 30 is easily released by releasing the brake of the winch and allowing the cable 47 to be payed out, after first releasing both latches 74 and 76. As the harness becomes elongated due to the paying out of cable 47, the cable of the harness is guided in its travel by means of guides 59 and 60.

The end pallet 42 contacts the ground first with all of the pallets sliding freely on the roller conveyor 32. Then the trailer is moved forward slowly and the cable 47 payed out at the same time. This literally moves the trailer from under the load, gently depositing each pallet 42 on the ground or some other supporting surface from the rear discharge end of the trailer.

After the trailer is completely unloaded new pallets can be placed on the trailer bed and lashed in place by cable 47. The trailer can then be returned to the orchard or site of vegetable collection at the field and reloaded.

It is understood that various changes may be made without departing from the claimed invention.

What is claimed as new is as follows:

1. A tiltable trailer for conveying and loading therefrom a load of a plurality of pallets, each having a plurality of stacks of articles positioned thereon, said tiltable trailer comprising a bed having a frame including spaced, longitudinally extending side members, means including a pair of wheels journaled for rotation about horizontal axes for supporting said frame above a supporting surface, with the upper surface of said bed disposed below the upper surfaces of said wheels, said wheels being disposed on opposite sides of said bed and spaced laterally from the opposite side members thereof, a front abutment wall rising from the front end of said frame against which said load is adapted to abut, a harness adapted to be placed over said load, said harness being attached at one end to said frame and including a pair of flexible tension members at the other end, a winding drum to which the opposite end of the harness is attached to wind and pay out the harness, a tongue, means including an approximately horizontal pivot connecting said tongue to the front end of said frame, a pivot coupling at the front end of said tongue and adapted to be connected to a draft vehicle, and means connected to said tongue intermediate its ends and connected to said abutment wall for adjusting the pivotal position of said tongue with respect to said frame to thereby tilt said frame so that said bed assumes an inclined position enabling the rear end thereof to engage said supporting surface, guide means on the upper portion of the rear end of said load slidably receiving said flexible tension members in laterally spaced relation and securing the portions of said tension members engaged with said guide means against movement transversely of said load, and means for securing the rear ends of said tension members to the side members of said frame adjacent the rear ends thereof with said tension members passed over the top and around the sides of the rear end of said load.

2. The combination of claim 1 wherein said frame includes a plurality of transversely extending, longitudinally spaced rollers adapted to support said pallets.

3. The combination of claim 1 wherein said guide means includes an angle member which is adapted to engage and extend along the upper rear edge of the load, and means for constraining said flexible tension members disposed over said angle member against movement longitudinally of said angle member.

4. The combination of claim 1 wherein said frame includes a plurality of transversely extending, longitudinally spaced rollers adapted to support said pallets, a stop carried by the rear portion of said frame to hold the load against rearward movement relative to the frame, and means for releasing said stop from the load.

5. The combination of claim 1 including resilient means holding said stop means in one position retaining said load and for returning said stop means to that position when retracted therefrom.

References Cited in the file of this patent

UNITED STATES PATENTS

| 1,095,679 | Shave et al. | May 5, 1914 |
|---|---|---|
| 1,212,190 | Davis | Jan. 16, 1917 |
| 1,249,257 | Venard | Dec. 4, 1917 |
| 1,346,152 | Amos et al. | July 13, 1920 |
| 1,632,204 | Threefoot et al. | June 14, 1927 |
| 2,513,855 | Fogwell | July 4, 1950 |
| 2,547,601 | Scheirer | Apr. 3, 1951 |
| 2,678,234 | Mazza | May 11, 1954 |
| 2,812,088 | Cadillac et al. | Nov. 5, 1957 |
| 2,823,817 | Holsclaw | Feb. 18, 1958 |